(12) United States Patent  (10) Patent No.: US 8,099,116 B2
Johan                      (45) Date of Patent: Jan. 17, 2012

(54) METHOD AND A SYSTEM FOR THE DELIVERY OF SHORT MESSAGES

(75) Inventor: Alexander Johan, Praha (CZ)

(73) Assignee: T-Mobile International AG & Co. KG., Bonn (DE)

( * ) Notice: Subject to any disclaimer, the term of this patent is extended or adjusted under 35 U.S.C. 154(b) by 500 days.

(21) Appl. No.: 12/272,745

(22) Filed: Nov. 17, 2008

(65) Prior Publication Data

US 2009/0131087 A1    May 21, 2009

(30) Foreign Application Priority Data

Nov. 15, 2007 (EP) .................................. 07022166

(51) Int. Cl.
H04W 4/14 (2009.01)
(52) U.S. Cl. ........................ 455/466; 370/328
(58) Field of Classification Search .......... 370/328, 370/401; 455/412.1, 412.2, 456.1, 456.2, 455/466
See application file for complete search history.

(56) References Cited

U.S. PATENT DOCUMENTS

2003/0055906 A1* 3/2003 Packham et al. ............. 709/206
2005/0036457 A1* 2/2005 Salin ............................ 370/328

FOREIGN PATENT DOCUMENTS

| DE | EP2037707 | * | 9/2007 |
| EP | 1 294 201 A1 | | 3/2003 |
| GB | EP1294201 | * | 9/2001 |
| WO | 01/22751 A1 | | 3/2001 |
| WO | 2004/107785 A2 | | 12/2004 |
| WO | 2008/006462 A1 | | 1/2008 |

* cited by examiner

Primary Examiner — Dwayne Bost
Assistant Examiner — Myron Wyche
(74) Attorney, Agent, or Firm — Browdy and Neimark, PLLC

(57) ABSTRACT

The invention relates to a method an system for forwarding a short message from a sender to a recipient within a telecommunication network, comprising the steps of sending the short message from the sender via at least one network node to the recipient, determining in the network node whether the recipient has activated a forwarding unconditional of the short message to a predefined forwarding destination, and if true, forwarding the short message to the predefined forwarding destination.

19 Claims, 1 Drawing Sheet

METHOD AND A SYSTEM FOR THE DELIVERY OF SHORT MESSAGES

FIELD OF THE INVENTION

The present invention generally relates to a short message telecommunication service and in particular to a method and system for the delivery of short messages.

STATE OF THE ART

The Short Message Service (SMS) is well known in the art and allows telecommunication users, particularly users of mobile telecommunication devices, to send and receive short messages. SMS was developed as part of the Global System for Mobile communications (GSM) digital standard.

There are certain occasions when the intended recipient of a SMS message is unable to receive it, for example, when the intended destination telephone is busy, or unavailable. In these cases, the short message is temporarily stored in a short message service center (SMSC) and delivered at some later time. However, is the recipient is unavailable for a longer time there is no guarantee that the SMS will be delivered at the end.

The Short Message Service in GSM is realized by the use of the Mobile Application Part (MAP) of the SS#7 protocol, with Short Message protocol elements being transported across the network as fields within the MAP messages. These MAP messages may be transported using traditional time division multiplex based signaling, or over IP using sigtran and an appropriate adaptation layer.

SUMMARY OF THE INVENTION

It is the object of the invention to provide a method and a system for the delivery of SMS messages to a recipient similar to a Call Forwarding Unconditional Service.

This object is achieved by providing a method for the delivery of SMS messages as characterized in the independent claim 1. A system for carrying out the method is described in claim 9.

Preferred embodiments and advantageous features of the invention are disclosed in the dependent claims.

The invention provides a method for a SMS FORWARDING UNCONDITIONAL service from an initial destination to a forwarding destination. The method allows the intended recipient to specify the forwarding destination. Unconditional SMS forwarding means that an intended recipient (primary B-party) has the possibility to redirect (for a certain time period) unconditionally all incoming SMS to a different number (secondary B-party).

The whole idea is based on standardized mobile terminated (MT) SMS delivery procedure, e.g. MAP-3GPP TS 09.02, adaptation and has been driven so as the desired status (i.e. the working SMS_FWD_UN service) has required the minimal existing technology and communication protocols adjustments.

The service itself is realized by means of a modification of the SMS routing message SRI_for_SM (Send Routing Info for Short Message) and its redirection to the relevant home location register HLR.

A network node comprising a stand alone signaling transfer point SA STP or a specialized SMS router intercepts the SRI_for_SM message for home subscribers and forwards this message to the local MAP layer. A specialized MAP service logic performs a manipulation of the SRI_for_SM message based on whether the recipient, i.e. the primary B-subscriber, has subscribed a SMS FORWARDING UNCONDITIONAL service or not and forwards the SRI_for_SM to the appropriate HLR. In case the recipient, i.e. the primary B-subscriber, has subscribed this service then the primary B-number is replaced with a forward to number FTNO, corresponding to a secondary B-subscriber, and the SRI_for_SM is routed to the HLR where the secondary B-subscriber record resides. Otherwise the unchanged SRI_for_SM message is forwarded to the HLR where primary B-sub record resides.

The HLR returns to the short message service center SMSC a SRI_for_SM Acknowledge message with the IMSI number of the B-subscriber (available subscriber) and a VMSC address where the B-subscriber is currently residing. The SMSC forwards the MT FORWARD_SM to the VMSC.

The VMSC returns a MT_FORWARD_SM Acknowledge to notify the successful delivery of the SMS message.

The described principle of SMS forwarding unconditional can be used as a basis for other SMS services like
1) CONDITIONAL SMS DELIVERY to a secondary B-party bases on the status of the primary B-party, e.g. primary B-party is busy, not reachable, or does not answer.
2) SMS REPLICATION, here SA STP. This service is based on a primary B-party wish and set-up and replicates incoming SMS destined to primary B-party. The original SMS is delivered to the primary B-party and the replicated SMS to a secondary B-party set-up by the primary B-party. This service could be used for instance in case parents would like to monitor SMSs that their children receive. If it is e.g. a paid SMS content, then parents can stop quickly receiving next paid SMSs to their child mobile phone to save money.

Below, a preferred embodiment of the invention is described in more detail with reference to the drawings.

DESCRIPTION OF A PREFERRED EMBODIMENT OF THE INVENTION

The preferred embodiment describes the technical realization of the service SMS FORWARDING UNCONDITIONAL by means of the specialized logic placed on the signaling switch, called SA STP: Stand Alone Signaling Transfer Point.

The SA STP usually serves in a Public Land Mobile Network (PLMN) as a central communication node equipped with the sophisticated logic given for the signaling traffic relay, routing, protocol conversions and other kinds of signaling traffic manipulations, e.g. screening, subscription determination, etc. Such a central signaling switch usually serves at the same time as a signaling Gateway from and to other national and/or international telephony and data networks.

Instead of using a SA STP the required logic for the realization of the SMS FORWARDING UNCONDITIONAL service can be deployed on a specialized SMS router provided the network is configured so as all the relevant signaling traffic is relayed via this specialized SMS router.

The invention is based on the following assumptions:
a) The network node SA STP (typically a pair) serves as the transfer and/or the relay point for at least all the relevant PLMN internal signaling traffic as well as for all the relevant signaling traffic flowing to/from other national and international networks.
b) The SA STP is equipped with the Mobile Number Portability (MNP) database look-up technique (regardless the database is physically collocated or not) that allows determine a Mobile Subscriber ISDN Number MSISDN subscription either to a certain national network (for the case when MNP applies) or to determine that it is a foreign international number.
c) The SMS FORWARDING UNCONDITIONAL is the service that provides a subscriber with the possibility to redirect unconditionally all the incoming SMS traffic to a predefined telephony number or network number that supports receiving of SMS messages.
d) The SA STP is equipped with a database look-up technique (regardless the database is physically collocated or not) that allows determine whether the B-subscriber, i.e. the recipient of the SMS, has subscribed the SMS FORWARDING UNCONDITIONAL service and if yes then what is the Forward-to-Number FTNO to which the SMS should be forwarded.

Figure 1:
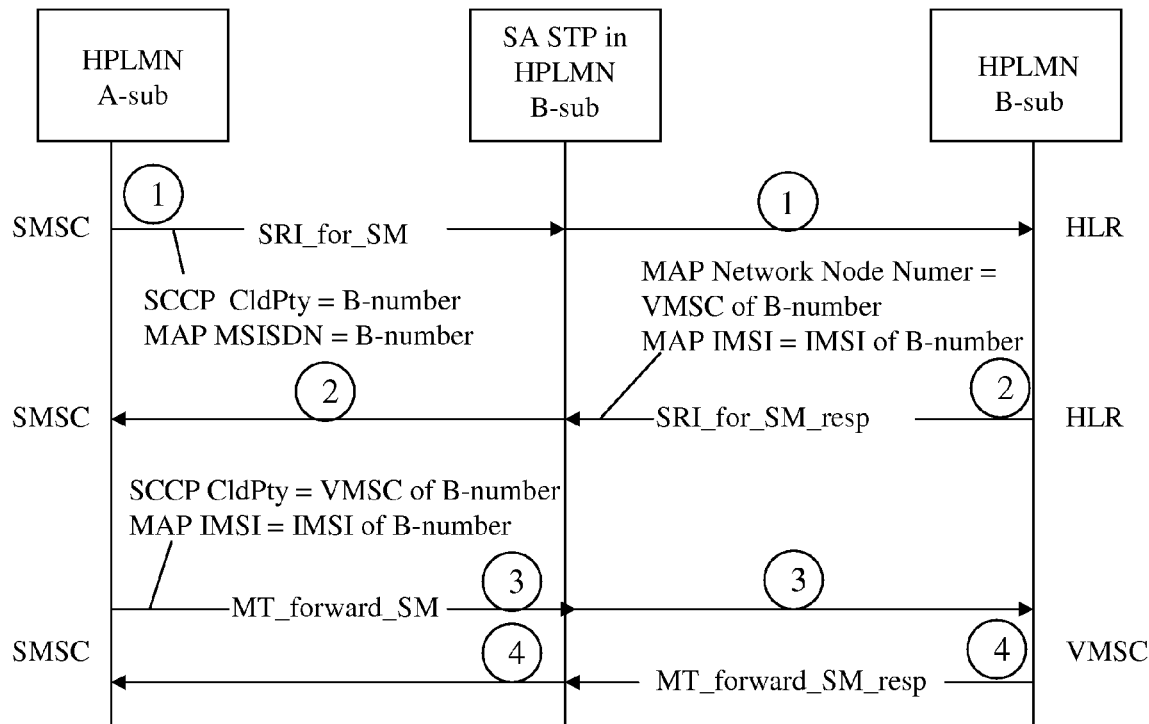
FIG. 1 shows a signaling flow diagram according to a standard mobile terminated SMS delivery signaling procedure for the case of a successful delivery. For reasons of simplicity, only MT SMS short dialog method is drawn for the case when the recipient (B-subscriber) is in the home mobile network (HPLMN). The SA STP serves in this case only as a signaling transfer and/or a relay point, i.e. it performs here only a signaling routing function and no MAP content manipulation is made.

FIG. 1 depicts a typical call flow for mobile terminated short message delivery (MT SMS). A SMS coming from an origin destination, namely an A-subscriber, which is to be transmitted to a recipient destination, namely a B-subscriber, is routed through the responsible short message service center SMSC. The successful functionality is not limited only to the case when both A and B subscribers reside in HPLMN at the time of SMS delivery. It should work regardless the current location of both subscribers (i.e. both can be in foreign outroaming=in FPLMN). The SMSC, on receipt of this short message, needs to discover the location of the recipient destination in order to be able to correctly deliver the short message to the recipient. As shown in step 1, the SMSC invokes a MAP service package MAP_SEND_ROUTING_INFO_FOR_SM, which sends a Send Routing Info for SM (SRI-for-SM) MAP message to the destination number's home location register HLR, requesting their present location. The HLR performs a database lookup to retrieve the recipient's current location, and, as shown in step 2, returns it in an acknowledgement message SRI for SM response to the SMSC. The current location may include an address of a visited mobile switching center (VMSC) the subscriber is currently roaming on, or an address of a serving GPRS support node (SGSN) address, or both. The HLR may also return the MAP IMSI of the recipient. After having obtained the routing information from the HLR, the SMSC will attempt to deliver the short message to the recipient. In step 3, this is done by invoking the MAP_MT_FORWARD_SHORT_MESSAGE service, which sends a MAP MT-Forward SM message to the address returned by the HLR. A successful delivery of the SMS is acknowledged by the VMSC by an MT_forward_SM_response message sent to the SMSC, as shown in step 4.

In the above example, the network node SA STP added according to the invention, serves only as a signaling transfer and/or a relay point, i.e. it performs only a signaling routing function and no MAP content manipulation is made.

Figure 2:
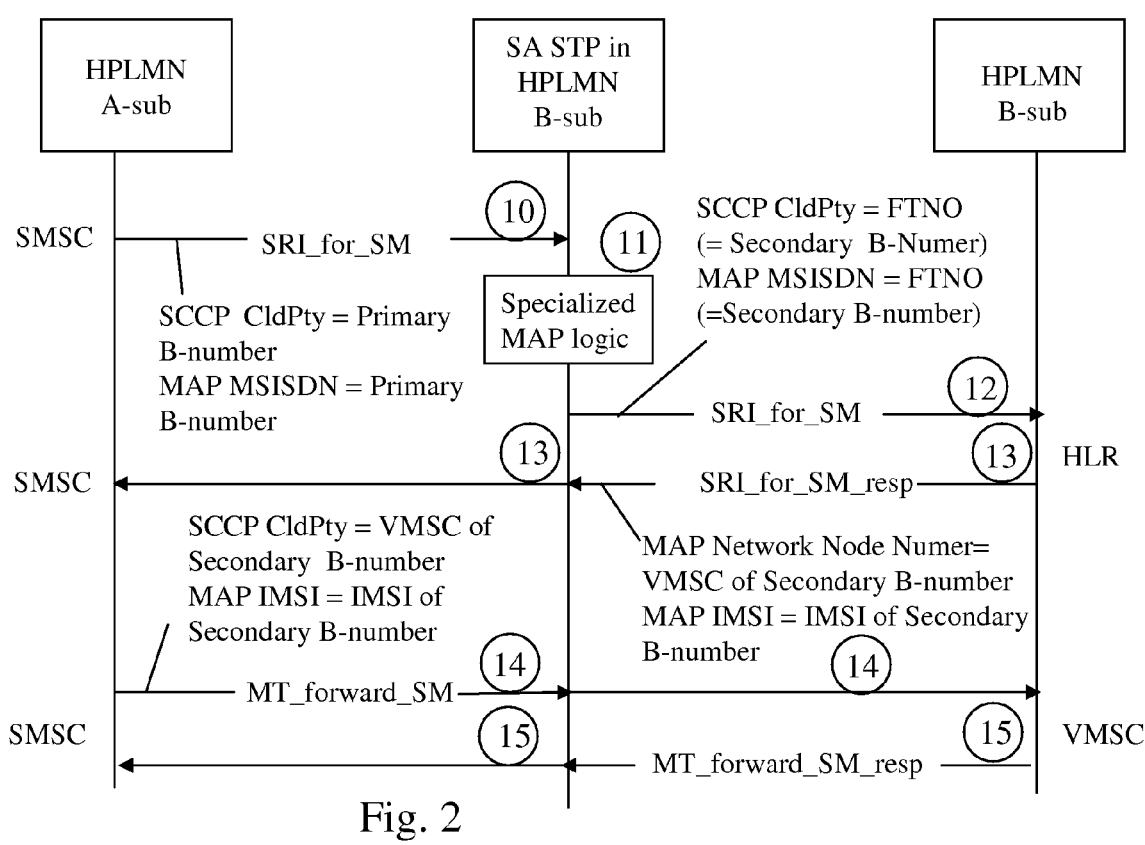
FIG. 2 shoes a signaling flow diagram for the SMS FORWARDING UNCONDITIONAL according to the invention, for the case of a successful delivery. For reasons of simplicity, only MT SMS short dialog method is drawn for the case when forwarding recipient (secondary B-subscriber) is in HPLMN. The SA STP serves in this case not only as a signaling transfer and/or a relay point, but it performs also the MAP and SCCP content manipulation by means of a specialized MAP logic. This MAP logic is preferably a software program that represents, in itself, the SMS FORWARDING UNCONDITIONAL service realization. The difference, as opposed to the standard MT SMS delivery procedure, is the interception of the SRI_for_SM message on the SA STP node and its modification by means of the specialized MAP logic, which realizes the forwarding function if required.

An SMS forwarding unconditional service according to the invention is described based on the signaling diagram of FIG. 2. In step 10, upon receiving the SRI_for_SM from a SMSC, the signaling connection control part SCCP layer in the SA STP forwards it, based on origin, subsystem identifier and application context, to the local mobile application part MAP layer, namely a specialized MAP logic 11. The MAP logic 11 initiates a number portability query, based on a lookup database, to check home subscriber addressing. Only SRI_for_SM traffic destined for own subscribers will be processed in the further steps.

The MAP service logic 11 will search through a database to determine whether the destination subscriber queried by the SRI_for_SM, i.e. the subscriber to which the SRI_for_SM was originally addressed, namely the primary B-subscriber, has subscribed the SMS FORWARDING UNCONDITIONAL service and if yes then what is the forward to number FTNO.

If the response to the query is the negative, then the original SRI_for_SM message is forwarded to the appropriate HPLMN HLR unchanged (as shown in step 1 of FIG. 1). If the response to the query is positive, then the MAP logic modifies the SRI_for_SM message as to replace the originally queried MSISDN, namely the primary B-number, with the FTNO that was found in the database look-up, namely the secondary B-number. The MAP service logic forwards the SRI_for_SM message towards the appropriate HLR, i.e. the unchanged message to the primary B-subscribers HLR (as shown in FIG. 1). The manipulated SRI_for_SM message is forwarded to the secondary B-subscribers HLR. This is shown in step 12. The HLR of the secondary B-subscriber will return a SRI_for_SM acknowledge message to the SMSC, as shown in step 13. The SRI_for_SM acknowledge message contains the visited mobile switching center VMSC address, i.e. the address of a network node where the recipient, namely the B-subscriber, is currently residing, and the international mobile subscriber identity number IMSI number of the queried B-number. Since the SMSC cannot recognize whether the received data actually correspond to the originally queried B-number or not, it normally starts the SMS delivery by means of an MT_forward_SM message to the VMSC, as to step 14. A successful delivery of the SMS is acknowledged by the VMSC by an MT_forward_SM_response message sent to the SMSC, as shown in step 15. If the SMS delivery is unsuccessful the whole MT SMS delivery phase is repeated again in accordance with a defined retry scheme.

In case that the SMSC sends a Report_SM_Delivery_Status message to the primary B-subscribers' HLR based on the secondary B-subscribers' status, for example because the SMS delivery was not successful because of absent secondary B-subscriber, the SA STP intercepts and manipulates, if needed, this message similar to the SRI_for_SM message. That means that the primary B-number contained in the SCCP_CldPty parameter and in the MAP_MSISDN parameter of the Report_SM_Delivery_Status message is replaced with the secondary B-number and the message is routed to the appropriate HLR.

| Reference Numbers and Abbreviations | |
|---|---|
| 1-4 | Signaling steps |
| 10-15 | Signaling steps |
| SMS_FWD_UN: | SMS Forwarding Unconditional |
| PLMN: | Public Land Mobile Network |
| HPLMN: | Home PLMN |
| IMSI: | International Mobile Subscriber Identity number |
| MSISDN: | Mobile Subscriber ISDN number |
| STP: | Signaling Transfer Point |
| SA STP: | Stand Alone Signaling Transfer Point |
| GW: | Gateway |
| SMS: | Short Message Service |
| SMSC: | Short Message Service Centre |
| SCCP: | Signaling Connection Control Part |
| MNP: | Mobile Number Portability |
| FTNO: | Forward to Number |
| MAP: | Mobile Application Part |
| MO SMS: | Mobile Originating SMS |
| MT SMS: | Mobile Terminating SMS |
| MSC: | Mobile Switching Centre |
| VMSC: | Visited MSC |
| HLR: | Home Location Register |
| A-sub: | sender of the SMS message |
| B-sub: | recipient of the SMS message |
| ClgPty: | Calling Party |
| CldPty: | Called Party |
| A-number: | MSISDN number of the sender of the SMS message |
| B-number: | MSISDN number of the recipient of the SMS message |
| Primary B-number: | MSISDN number of the originally addressed recipient of the SMS message, i.e. it is the number that A-sub used to address B-sub when composing and dispatching the SMS |
| Secondary B-number: | (= FTNO) MSISDN number to that the originally addressed B-Sub wants to forward its incoming SMS traffic |
| Primary B-sub: | owner (subscriber) of the primary B-number |
| Secondary B-sub: | owner (subscriber) of the secondary B-number |

The invention claimed is:

1. A method for forwarding a short message from a sender to a primary recipient within a telecommunication network, comprising the steps of:
   sending the short message from the sender via at least one network node to the primary recipient;
   determining in the network node whether the primary recipient has activated a short message service forwarding unconditional to a predefined forwarding destination, and
   if the primary recipient has activated a short message service forwarding unconditional, forwarding the short message to the predefined forwarding destination; and
   if the primary recipient has not activated short message service forwarding unconditional, performing, based on the status of the primary recipient, a conditional short message service delivery to a secondary recipient, the status including: the primary recipient is busy; the primary recipient is not available; or the primary recipient does not answer.

2. The method according to claim 1, further comprising the steps of
   intercepting a SMS routing request signaling message, SRI_for_SM, in the network node,
   forwarding the SRI_for_SM message to a local Mobile application part, MAP, layer,
   performing a manipulation of the SRI_for_SM message within the MAP layer by means of a specialized MAP service logic in case the primary recipient has activated the SMS FORWARDING UNCONDITIONAL service,
   replacing the primary recipient's primary B-number with a forward to number, FTNO of a secondary B-subscriber,
   routing the manipulated SRI_for_SM message to the home location register HLR where the secondary B-subscriber record resides,
   sending a SRI_for_SM Acknowledge message with a secondary B-IMSI number and a VMSC address where the B-subscriber is currently residing from the HLR to the SMSC, and
   forwarding the SMS message from the SMSC to the VMSC and the forwarding destination based on the B-IMSI and VMSC address.

3. The method according to claim 1, wherein the network node includes a central signaling switch.

4. The method according to claim 3, wherein the central signaling switch is a stand alone signaling transfer point SA-STP.

5. The method according to claim 1, wherein the network node includes a short message service router.

6. The method according to claim 1, wherein the primary recipient is able to activate the short message forwarding unconditional service in order to redirect all incoming short messages to a predefined forwarding destination.

7. The method according to claim 1, wherein the predefined forwarding destination is a telephone number.

8. The method according to claim 1, wherein the predefined forwarding destination is a network address.

9. A system for forwarding a short message from a sender to a primary recipient, the system being included in a telecommunication network and comprising:
   means for sending the short message from the sender to the primary recipient;
   a network node for determining whether the primary recipient has activated a short message service forwarding unconditional to a predefined forwarding destination, and
   means for forwarding the short message to the predefined forwarding destination, if the primary recipient has activated a short message service forwarding unconditional,
   said system further comprising:
   means for performing a conditional short message service delivery to a secondary recipient based on the status of the primary recipient, if the primary recipient has not activated a short messaging service forwarding unconditional, the status including:
   the primary recipient is busy; the primary recipient is unreachable;
   or the primary recipient does not answer.

10. The system according to claim 9, wherein the network node includes a central signaling switch.

11. The system according to claim 10, wherein the central signaling switch is a stand alone signaling transfer point SA-STP.

12. The system according to claim 9, wherein the network node includes a short message service router.

13. A non-transitory computer-readable medium embodying a data processing software program comprising a program code which performs a method according to claim 1 when it is executed on a suitable data processing system.

14. A non-transitory computer-readable medium embodying a data processing program product comprising a program code which is executable on a data processing system for performing a method according to claim 1.

15. The method according to claim 2, wherein the network node includes a central signaling switch.

16. The method according to claim 15, wherein the central signaling switch is a stand alone signaling transfer point SA-STP.

17. The method according to claim 2, wherein the network node includes a short message service router.

18. A non-transitory computer-readable medium embodying a data processing software program comprising a program code which performs a method according to claim 2 when it is executed on a suitable data processing system.

19. A non-transitory computer-readable medium embodying a data processing program product comprising a program code which is executable on a data processing system for performing a method according to claim 2.

* * * * *